United States Patent
Ono et al.

(10) Patent No.: US 6,274,665 B2
(45) Date of Patent: Aug. 14, 2001

(54) METHOD OF PREPARING A MOLDED SEALING COMPOSITION FOR SEALING AGAINST PERMEATION OF CARBON DIOXIDE GAS

(75) Inventors: Shigeyuki Ono; Takashi Ohta; Hideyuki Tokumitsu; Hironori Minagawa; Osamu Kobayashi, all of Ibaraki-ken (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/737,744

(22) Filed: Dec. 18, 2000

Related U.S. Application Data

(62) Division of application No. 09/175,995, filed on Oct. 21, 1998.

(30) Foreign Application Priority Data

Oct. 31, 1997 (JP) .................................... 9-316301
Dec. 12, 1997 (JP) .................................... 9-362732
Feb. 4, 1998 (JP) .................................... 10-38056

(51) Int. Cl.$^7$ .................................... C08K 3/00
(52) U.S. Cl. ............................ 524/493; 524/496
(58) Field of Search ...................... 524/493, 496

(56) References Cited

U.S. PATENT DOCUMENTS 5,371,143 * 12/1994 Novak et al. ........................ 525/88

OTHER PUBLICATIONS

Abstract of Japanese No. 59–40066, Mar. 5, 1984, Masayasu et al, "Sealing Material Having Resistance to Lubricating Oil".

Abstract of Japanese No. 6–25500, Feb. 1, 1994, Yoshihiro, "New Fluororubber Composition".

Abstract of Japanese No. 3–2197, Apr. 5, 1984, Masayasu et al, "Paint Composition".

Abstract of Japanese No. 3–59937, Feb. 13, 1985, Masaharu et al, "Fluorine–Containing Thermoplastic Rubber . . . ".

Abstract of Japanese No. 7–68430, Mar. 27, 1991, Masanaga, "Thermoplastic Elastomer Composition, Its Molding . . . ".

* cited by examiner

*Primary Examiner*—Edward J. Cain
(74) *Attorney, Agent, or Firm*—Jacobson Holman, PLLC

(57) ABSTRACT

An object of the present invention is to provide a molding composition having an excellent properties to seal carbon dioxide. The composition is made of fluoro thermoplastic elastomer having a reinforcing filler such as carbon black or white carbon having a particle diameter of not more than 100 nm. The composition can be used as a sealing materials such as O-ring, oil seal, gasket, hose, tube or diaphragm for sealing carbon dioxide.

8 Claims, 4 Drawing Sheets

METHOD OF PREPARING A MOLDED SEALING COMPOSITION FOR SEALING AGAINST PERMEATION OF CARBON DIOXIDE GAS

This is a divisional of application Ser. No. 09/175,995 filed Oct. 21, 1998.

BACKGROUND OF THE INVENTION

1. Field of the Invention

The present invention relates to a molding composition for sealing carbon dioxide, and a molded composition having an excellent sealing property to be able to be used for sealing carbon dioxide. Also, the present invention relates to a sealing device to provide a seal between relatively movable portions on one of which a portion of the sealing device is held, sealingly contacting with another movable portion at a seal lip of the sealing device.

2. Related Art

Conventionally, Freon gas has been used in almost all automobile air-conditioners, refrigerators or the like as a coolant. But from the point of view of environment disruption (the depletion of the ozone layer, global warming or the like), new coolants other than Freon gas have been recently extensively studied. Carbon dioxide is considered to be one of a most hopeful next generation of coolants. In the case of conventional Freon gas, sealing Materials such as hydrogenated NBR, EPDM (Ethylene-Propylene-Diene terpolymer) or the like have been used as sealing materials, but these materials have some defects such as swelling and blistering which occurs in the sealing materials when contacting carbon dioxide. These undesirable phenomena tend to cause the sealing device to be unusable. Particularly, the addition of a non-reinforcing filler with a large particle size such as mica or graphite for aiming to decrease in gas permeability of these rubber materials makes blisters occur easily, resulting in an unusable condition as a molded composition for sealing carbon dioxide.

On the other hand, there are some materials having a property of low gas permeability to carbon dioxide, such as vinylidene fluoride resin or the like. But these materials have a defect in processability or flexibility which rubber materials usually have. When these resin like materials are used as sealing materials—especially such a sealing means as a rotating shaft seal, a reciprocating shaft seal or the like, response to an axis to be sealed is slow when the axis is biased. This phenomena causes a microscopical gap between the seal lip and the axis and then to cause leakage of a sealing medium. In addition, when the sealing material made of vinylidene fluoride resin is assembled with an axis having splines (grooves made in the direction of the axis), a scratch is easy to occur by the splines and the scratch may not allow to keep optimum sealing performance.

There is a fluoro rubber which contains vinylidene fluoride. This type of fluoro rubber has excellent flexibility but the anti-permeability to carbon dioxide is not good.

Furthermore, it has been described in the publication of Japanese patent Tokkai Sho 59-40066 (1984), Tokkai Hei 6-25500 (1994), Tokko Hei 3-2197 (1991), Tokko Hei 3-59937 (1991) and Tokko Hei 7-68430 (1995) that a fluoro thermoplastic elastomer can be used for a molding material for a sealing composition resistant to lubricant. However, in these descriptions, MT carbon black (particle diameter: 201 to 500 nm) which is commonly used as a reinforcing fillet for fluoro rubbers has been used as it is.

When fluoro thermoplastic elastomer containing MT carbon black is used for sealing devices for sealing carbon dioxide, both permeability of and swelling due to exposure to carbon dioxide is large, and a blister phenomena can be seen so that these compositions cannot be safely used in the seal for sealing carbon dioxide.

SUMMARY OF THE INVENTION

An object of the present invention is to provide a molding composition being composed of a fluoro rubber type thermoplastic elastomer and a reinforcing filler, having an excellent anti-carbon dioxide gas permeability and anti-swelling property to carbon dioxide gas, and especially having an excellent anti-blistering property to carbon dioxide gas.

Another object of the present invention is to provide a molded sealing composition having excellent sealing properties to carbon dioxide as well as having excellent rubber like responsive properties.

Another object of the present invention is to provide a sealing device having excellent sealing properties to carbon dioxide as well as having excellent rubber like responsive properties to a sliding portion to be sealed.

The object of the present invention can be achieved by using a reinforcing filler with a particle size of 100 nm or smaller in a fluoro thermoplastic elastomer, preferably by using the reinforcing filler and a non-reinforcing filler in combination. Another object of the present invention can be achieved by molding the fluoro thermoplastic elastomer with or without other rubber materials into various sealing products to seal carbon dioxide. Another object of the present invention can be achieved by placing a fluoro thermoplastic elastomer composition having reinforcing filler of not larger than 100 nm in particle diameter onto a surface of fluoro rubber sealing materials to form a sealing device.

DETAILED DESCRIPTION OF THE INVENTION

Figure 1:
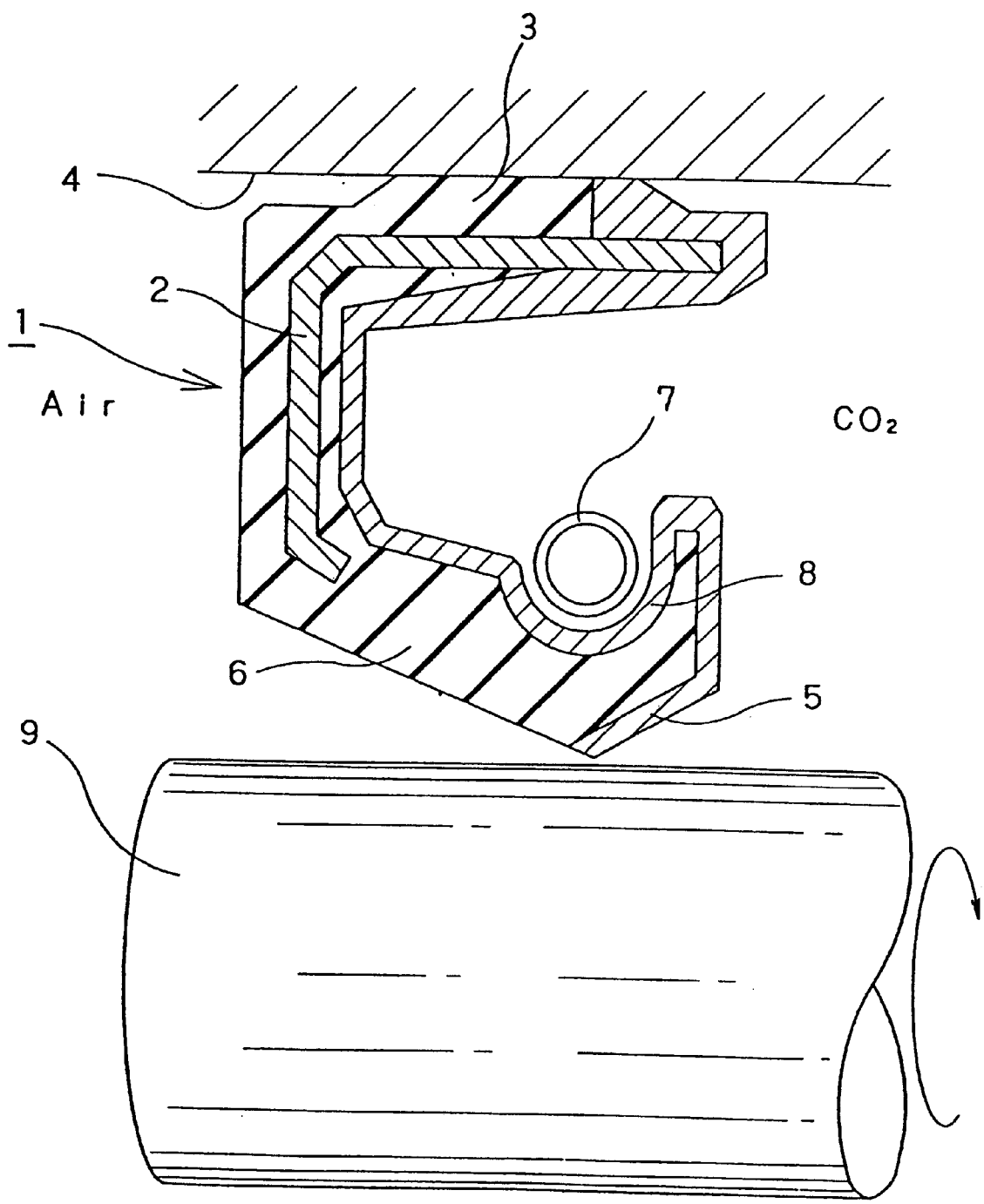
FIG. 1 shows a cross sectional view of a sealing device for sealing carbon dioxide of the present invention.

Fluoro thermoplastic elastomer is classified into two types, namely, block type and graft type. In the present invention both of the two types can be used; preferably, the block type is used.

The block type of fluoro thermoplastic elastomer is an ABA type fluoro thermoplastic elastomer to be synthesized by radical polymerization of fluoro monomers in chain transfer reaction (telomerization) which is uniquely caused by iodine compound. The block type fluoro thermoplastic elastomer is comprised of fluoro rubber (soft segment) and fluoro resin (hard segment), which form triblock copolymer.

The soft segment and hard segment are chemically bonded to each other in a single molecule. The block type thermoplastic elastomer shows both rubbery and resinous properties and can be molded without curing agent into a molded product to have a rubbery elasticity.

Monomers composing the soft segment include vinylidene fluoride, tetrafluoroethylene, hexafluoropropene or the like. For examle a soft segment such as vinylidene fluoride— hexafluoropropene—tetrafluoroethylene terpolymer is composed of these monomers. On the other hand, monomers composing the hard segment include vinylidene fluoride, ethylene, tetrafluoroethylene or the like. For example, a hard segment such as polyvinylidenefluoride segment or tetrafluoroethylene-ethylene copolymer segment are provided from those monomers.

Reinforcing fillers such as carbon black or silica, preferably carbon black, having a particle diameter of not larger than 100nm are added into these fluoro thermoplastic elastomers. Examples of the carbon black having a particle diameter of not more than 100 nm are SAF (particle size: 11–19 nm), ISAF (particle size: 20–25 nm), HAF (particle size: 26–30 nm), XCF (particle size: 31–39 nm), FEF (particle size: 40–48 nm), GPF (particle size: 49–60 nm), and SRF (particle size: 61–100 nm). When using reinforcing filler having a particle diameter of larger than 100 nm, the reinforcing effect of the particle is insufficient to cause blisters in molded articles. In the thermoplastic elastomer, about 5 to 100 parts per hundred rubber (phr), preferably about 10 to 70 phr of these reinforcing fillers to 100 phr of thermoplastic elastomer is used. When the amount of fillers is used in an amount of more than the above mentioned phr range, there arises a difficulty in blending elastomer with-the filler. On the other hand, when the amount of fillers is less than the above mentioned phr range, there arise blisters in cured articles.

Examples of non-reinforcing fillers which are used together with the reinforcing filler mentioned above are calcium metasilicate, diatomite, graphite, mica, calcium carbonate, zinc oxide or the like. About 5 to 100 phr, preferably about 5 to 60 phr of one or more kinds of non-reinforcing fillers to 100 phr of thermoplastic elastomer can be used in the compound. And the combined amount of both reinforcing and non-reinforcing fillers are in the range of about 10 to 200, preferably about 10 to 100 phr to the 100 parts of the elastomer.

These non-reinforcing fillers are preferably used after surface treatment with silane coupling agents or the like before using in order to obtain wetability between thermoplastic elastomer and non-reinforcing fillers. The average particle diameter of non-reinforcing filler is not limited specifically. Powder type non-reinforcing fillers can be used generally.

Organic peroxide is added into the aforementioned composition as a curative. Organic peroxides are exemplified by 1,1-bis(tertiary butyl peroxy)-3,3,5-trimethylcyclohexane, 2,5-dimethylhexane-2,5-dihydroperoxide, di-tertiary butyl peroxide, tertiary butyl cumyl peroxide, dicumyl peroxide, α,α-bis(tertiary butyl peroxy)-p-diisopropyl benzene, 2,5-dimethyl -2,5-di(tertiary butyl peroxy)hexane, 2,5-dimethyl-2,5-di(tertiary butyl peroxy)hexine-3, benzoyl peroxide, tertiary butyl peroxy benzene, 2,5-dimethyl-2,5-di(benzoyl peroxy)hexane or the like. About 0.1 to 20 phr, preferably about 0.5 to 10 phr, of organic peroxides to 100 phr of thermoplastic elastomer is used in the molding composition.

Besides these essential ingredients in this present invention mentioned above, typical polyfunctional unsaturated crosslinking agents such as triallylisocyanurate or the like and other various additives can be added into this molding composition.

In order to decrease the viscosity of the molding composition, about 5 to 60 phr, preferably about 5 to 40 phr of organic solvents can be added into the composition to 100 phr of thermoplastic elastomer. Examples of the organic solvent are aromatic or aliphatic hydrocarbons such as toluene, xylene, n-hexane or the like, esters of carboxylic acid such as ethyl acetate or the like, ketones such as acetone, methylethyl ketone, methyl isobutyl ketone or the like, alcohols such as methanol, ethanol or the like, ethers such as tetrahydrofuran or the like, non-protonic polar solvents such as dimethyl acetamide and dimethyl formamide. At least one of the above mentioned organic solvents or a mixture of these solvents or a mixture of these organic solvents with water is usefully added into the composition of the present invention.

The molding composition can be prepared first by mixing all ingredients except curatives in a kneader, and after the thus obtained mixed compound is further kneaded on a heating roll, curatives are added into the mixed compound thereafter. The molding composition of the present invention can be also obtained by using a twin screw extruder to mix the elastomer with fillers and additives which are supplied through a feeder set halfway of the screw. It is also possible to use the combination of a twin screw extruder where all ingredients except curatives are mixed and one screw extruder where curatives are added. In this case the composition containing curatives can be extruded through T die to form a sheet like molding composition. Moreover, it is more desirable to eliminate air or volatile materials contained in the mixed composition using a vent type extruder for preventing blisters.

The molding composition prepared above is molded by press molding, injection molding or the like to form a molded sealing composition at the temperature of about 150 to 220° C., at the pressure of about 100 to 1500 Kgf/cm2, and for about 1 to 20 minutes and then followed by an oven vulcanizing process (secondary vulcanization or secondary cure) at the temperature of about 180 to 230° C. for about 1 to 24 hours.

The molded sealing composition for sealing carbon dioxide Of the present invention can be effectively used as a portion of a sealing device to seal carbon dioxide between relatively movable portions, on one of which the sealing device is mounted and slidably engaging with another relatively movable portion at a seal lip of the sealing device. Oil seals or the like are examples of these sealing devices.

FIG. 1 shows a cross sectional view of a sealing device which is formed by using the molded sealing composition of the present invention. Wherein, the sealing device 1 is comprised of a sealing portion of a lip or the like being integrally formed on a metal ring 2, and an outer sealing portion 3 which is mounted on an inner periphery of a housing 4. In an inner peripheral side of the sealing device, an edge portion of slidable sealing portion 5 and 6 is pressed toward an axis 9 via a spring holder 8 by a garter spring 7 to cause sealing contact with the axis. In this construction, a dust lip may be installed to prevent foreign material such as dust or the like to enter into the carbon dioxide side from the air side, if necessary.

The sealing portion 5 is made of the fluoro thermoplastic elasotmer composition, and the sealing portion 6 is made of a fluoro rubber composition and a part of the sealing portion is covered by the fluoro thermoplastic elastomer composition as is shown in FIG. 1. The sealing device having the sealing portions 5 and 6 can be manufactured by using a mold die as is shown in FIGS. 2, 3 and 4.

Figure 2:
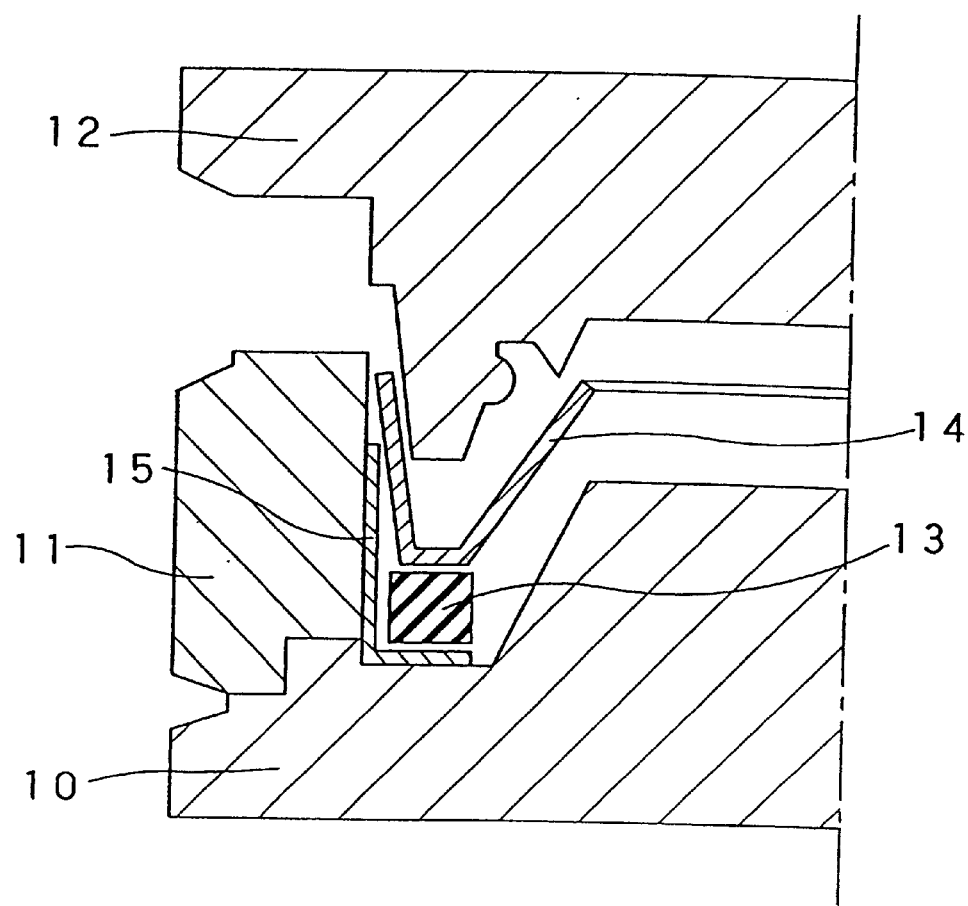
FIG. 2 shows a cross sectional view of a metal ring, fluoro rubber and fluoro thermoplastic elastomer composition that are placed between an upper and a lower mold die. The die is then set to press mold at a certain temperature and pressure to mold these materials.
Figure 3:
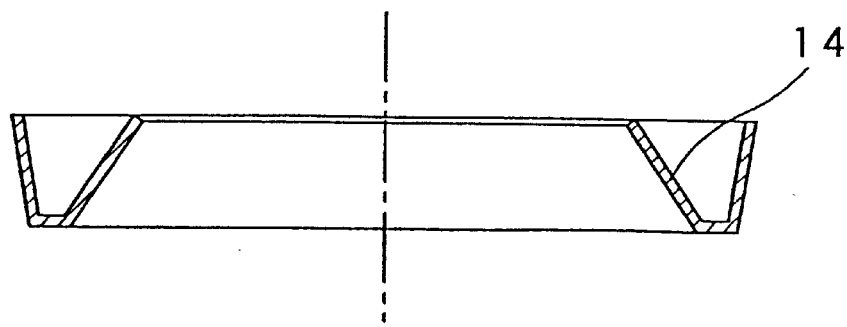
FIG. 3 shows a cross sectional view of a fluoro thermoplastic elastomer composition that is to be formed into a sliding sealing portion of the sealing device.
Figure 4:
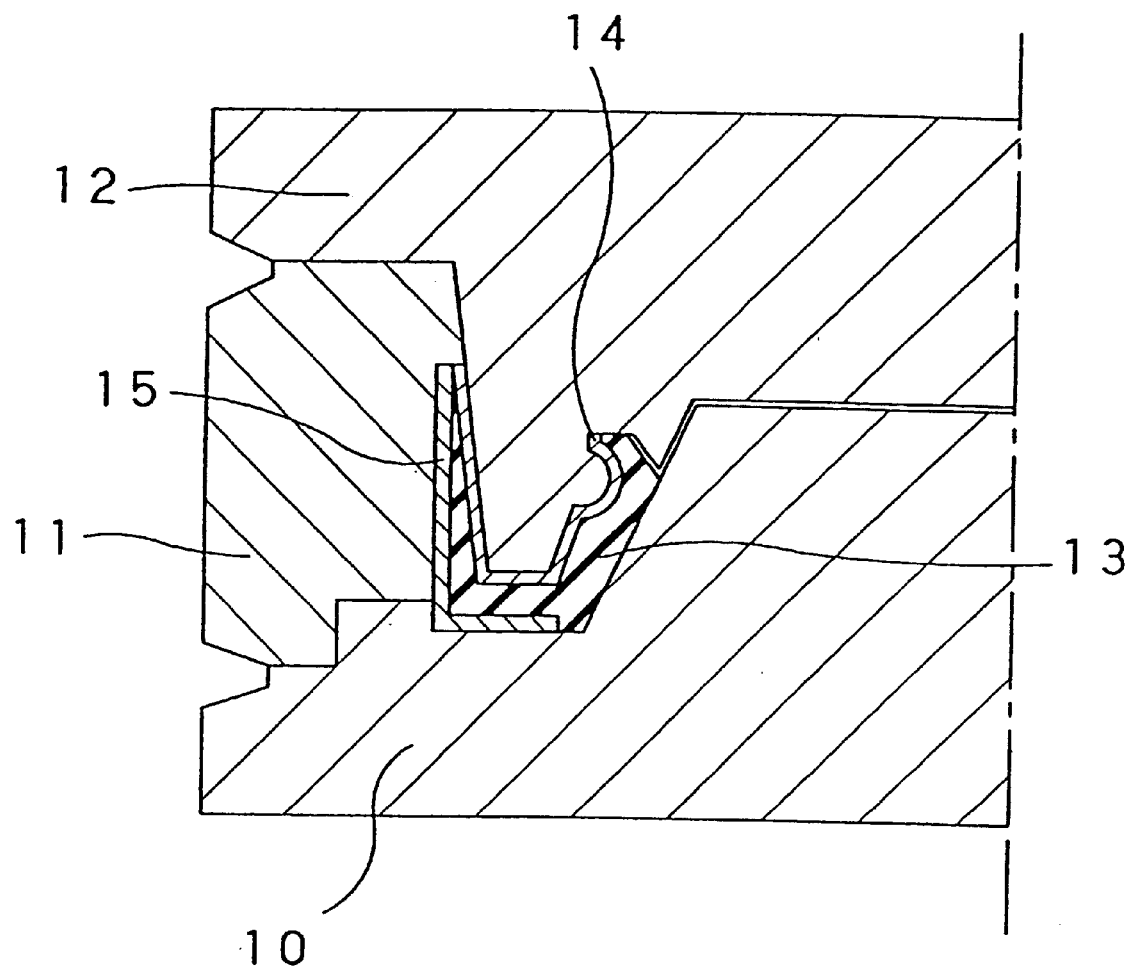
FIG. 4 shows a cross sectional view of the mold die and the sealing device that has just been molded in the die.

As is shown in FIGS. 2, 3 and 4, a molding die is composed of a lower die 10, 11 which is used for forming an air side portion of the sealing device and an upper die 12 which is used for forming a carbon dioxide side portion. Fluoro rubber composition 13 is placed in the lower die as shown in FIG. 2, then as shown in FIG. 3 pre-shaped fluoro thermoplastic elastomer composition 14 is placed together with a metal ring 15, and then the upper die 12 is placed to compression-mold. At this time it is desirable that the temperature of these dies are heated up to melting temperature of the fluoro thermoplastic elastomer 14. Fluoro rubber composition 13 and fluoro thermoplastic elastomer composition 14 are, by flowing into the back of the metal case 15, formed into sliding portions 5 and 6 of the sealing portion as shown in FIG. 1.

As for the fluoro rubber composition which is formed into the sealing sliding portion 6, vinylidene fluoride copolymer such as vinylidene fluoride—hexafluoropropen copolymer, vinylidene fluoride—pentafluoropropen copolymer, vinylidene fluoride—chlorotrifluoroethylene copolymer, vinylidene fluoride—hexafluoropropen—tetrafluoroethylene terpolymer, vinylidene fluoride—pentafluoropropen—tetrafluoroethylene terpolymer, vinylidene fluoride—perfluoro(methyl vinyl ether)—tetrafluoroethylene terpolymer or the like can be used, and it is more desirable that at least one kind of monomer used in the fluoro rubber is also used as the monomer in the fluoro thermoplastic elastomer for reasons to be mentioned below. Viton B or the like, for example, which is a fluoro rubber manufactured by Du Pont de Nemours & Co. can be used as a rubber ingredient in a fluoro rubber composition.

Similar kinds of compounding ingredients which are used in the fluoro thermoplastic elastomer composition can be used in these fluoro rubber compositions, and polyol type curatives or polyamine type curatives can be used, but peroxide type curatives can be preferably used. It is also desirable that the fluoro rubber and fluoro thermoplastic elastomer are cured by the same curing agent, but different curing agents can also be used for each rubber and elastomer according to the purpose or the environment of use of the product.

The sliding sealing portion 5 is made of the fluoro thermoplastic elastomer composition. There are two kinds of fluoro thermoplastic elastomers, block type and graft type. In the present invention any of the two kinds of fluoro thermoplastic elastomers can be used, but block type elastomer is more preferably used.

The composition of fluoro rubber and fluoro thermoplastic elastomer are molded by compression molding, injection molding or the like at the temperature of about 150 to 220° C. at the pressure of about 100 to 1500 Kgf/cm$^2$, for about 1 to 20 minutes and then oven cured (secondary cure) at the temperature of about 180 to 230° C., for about 1 to 24 hours. The fluoro thermoplastic elastomer composition is used in the range of about 0.1 to 0.9 volume ratio, preferably about 0.3 to 0.7, in the combined amount of the fluoro rubber composition and the fluoro thermoplastic elastomer composition of the sealing device.

Figure 5:
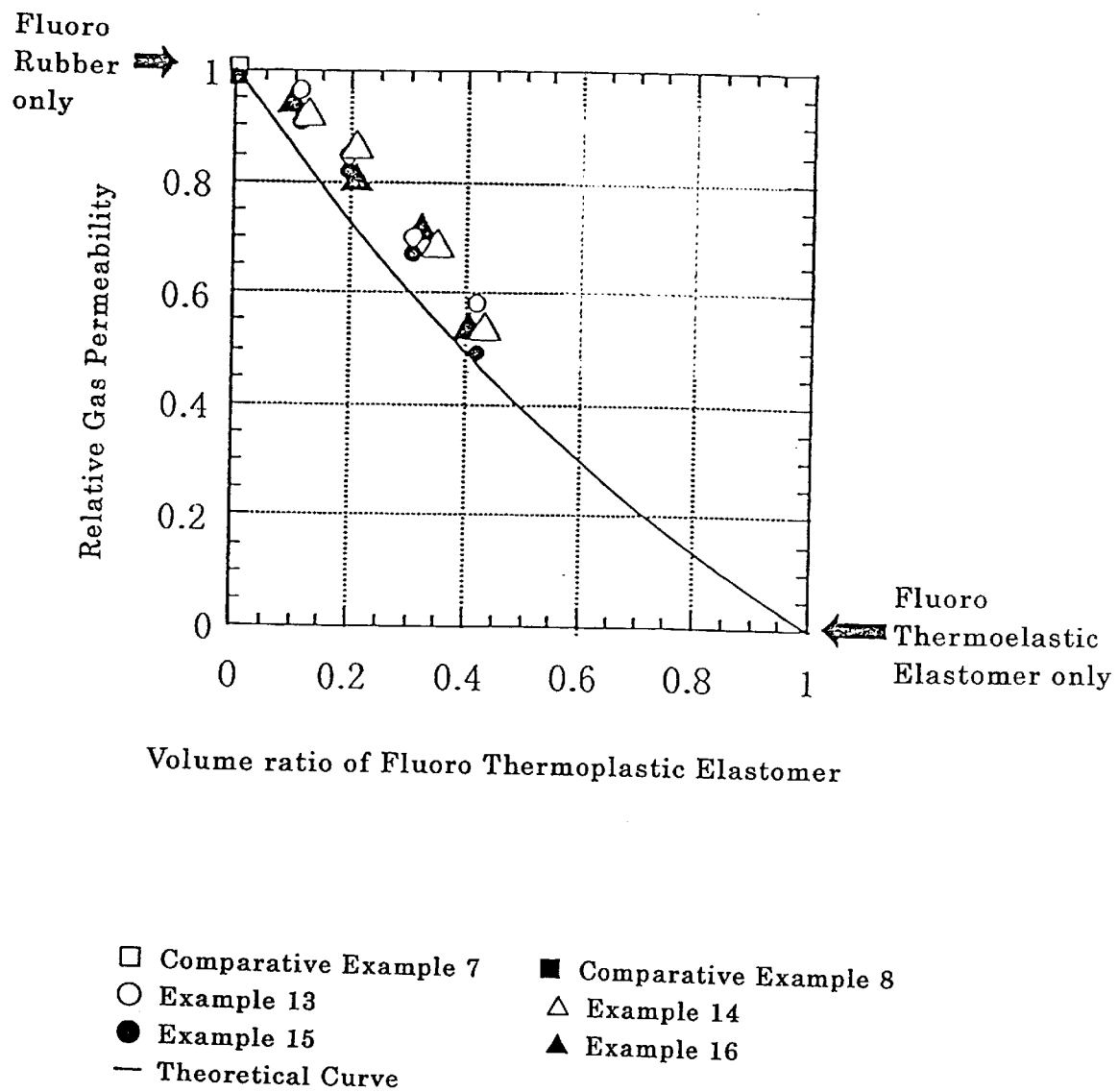
FIG. 5 is a graph that shows relationships between volume ratio of fluoro thermoplastic elastomer in the sealing device and relative gas permeability.

It is necessary that a portion of the surface of the sealing device that directly contacts with carbon dioxide is at least made of fluoro thermoplastic elastomer composition. If the surface which directly contacts with carbon dioxide is all covered with the fluoro thermoplastic elastomer composition, the volume of the fluoro thermoplastic elastomer composition in the sealing device is based upon the ratio of the thickness of the sliding portion 5 in FIG. 5 and the carbon dioxide permeability across the sealing device can be more effectively decreased.

Fluoro rubber and fluoro thermoplastic elastomer are crosslinked respectively in each composition, and at the same time in the interface of each composition, the same kind of monomer segments of both rubber and elastomer tend to agglomerate and simultaneously to be cross-linked with each other by chemical reaction to cause a strong bond in the interface between rubber and elastomer without using any adhesives.

The crystalline segment of the copolymer (hard segment) in fluoro thermoplastic elastomer has a melting temperature. Above the melting temperature, the crystalline segment will melt and the molecular chain in the segments becomes highly movable. Under these conditions agglomeration of the same kind of segments in the polymer occurs easily, so that the molding temperature of each material used must be carefully set to obtain maximum effect of agglomeration.

Fluoro thermoplastic elastomer, when compared to vinylidene fluoride resin, has a rather elastic property similar to fluoro rubber. So the sliding sealing portion which is made of both fluoro rubber and fluoro thermoplastic elastomer has an excellent property with respect to the portion to be sealed.

EFFECT OF THE INVENTION

The molding composition of the present invention shows excellent properties in anti-permeability to carbon dioxide gas and in resistance of swelling and blistering when contacting carbon dioxide. Therefore, the molding composition can be effectively used for molding sealing articles (lip seal, packing, gasket, O-ring, or the like) , hoses, tubes, diaphragms, or the like which contact with carbon dioxide.

According to the present invention, fluoro rubber and fluoro thermoplastic elastomer which preferably contain at least one common copolymer component in both rubber and thermoplastic elastomer are combined to form a sliding sealing portion of a sealing device for sealing carbon dioxide so that excellent bonding strength can be obtained between the interface of both rubber and thermoplastic elastomer without using any adhesives. There is no need to use adhesives between an interface of both rubber and thermoplastic elastomer. And as a result not only the cost of the adhesion process can be eliminated but also high durability in sliding sealing portion can be attained.

On the other hand, by using fluoro thermoplastic elastomer in the sliding sealing portion, rubbery elasticity that has not been attained when fluoro resin has been used can be secured. And an excellent property in decreasing permeation of carbon dioxide gas across the sealing device is also attained and also an excellent property in responding to the portion to be sealed is attained.

Moreover, by varying volume ratio of fluoro rubber to fluoro thermoplastic elastomer, a sealing device having a desired carbon dioxide permeability can be obtained.

The invention is shown in more detail in the following examples and these embodiments should not be interpreted as limiting the scope of the present invention.

EXAMPLE

Example 1

| | |
|---|---|
| Fluoro thermoplastic elastomer | 100 phr |
| (Daikin product Daiel-Thermo T-630) | |
| FEF carbon black | 35 phr |
| Magnesium oxide | 5 phr |
| Organic peroxide | 1.5 phr |
| (Nippon Yusi product Percumyl D) | |
| Triallyl isocyanurate | 3 phr |
| (Nihon Kasei product Taic M60, 60%) | |

Ingredients except for an organic peroxide were mixed using a 3L kneader and further kneaded on a heating roll (80° C.), and finally the organic peroxide was mixed. The thus obtained thermoplastic elastomer composition was press vulcanized at the temperature of 195° C. for 8 minutes and then oven cured (secondary vulcanization) at 200° C. for 15 hours to make two discoid sheets with a diameter of 90 mm and thickness of 0.5 mm. One of these sheets was assigned to a discoid sample with a diameter of 50 mm and the other was punched to make a squared sample with a size of 30×30 mm.

The discoid sample was used for measuring carbon dioxide permeability ($cm^3 \cdot mm/m^2 \cdot atm \cdot 24$ hours) under the condition of 5 $kgf/cm^2$ by using a gas permeability gauge of Gasperm 100 (Nihon Bunko Kogyo product). The squared sample was used for measuring the change of weight (weight swelling ratio, weight %) of the sample by putting the sample in a pressure-proof container with an inner volume of 50 ml, injecting carbon dioxide gas into the pressure-proof container, and finally letting it stand in the conditions of 100° C., 80 $kgf/cm^2$, for 2 hours followed by returning to room temperature and atomospheric pressure, together with the number of blisters ( number/ $cm^2$) occurred on the surface of the sample.

Example 2

In Example 1, ten (10) phr of FEF carbon black was used instead of 35 phr of FEF carbon black, and 30 phr of acetone and 10 phr of methanol were further added.

Example 3

In Example 2, same amount of silica (Aerosil Co. product, A200) was used instead of FEF carbon black.

Comparative Example 1

In Example 1, FEF carbon black was not used.

Comparative Example 2

In Example 1, same amount of MT carbon black was used instead of FEF carbon black.

Comparative Example 3

| | |
|---|---|
| Hydrogenated NBR | 100 phr |
| (Nippon Zeon product, Zetpol 2010) | |
| FEF carbon black | 35 phr |
| Zinc oxide | 5 phr |
| Organic peroxide | 8 phr |
| (Nihon Yusi product, Peroximon F40) | |
| Stearic acid | 0.5 phr |

Mixing, vulcanization (press cure was done at 180° C., for 4 minutes; secondary cure was done at 165° C., for 30 minutes) and measurement were carried out by the same method as in Example 1.

Comparative Example 4

| | |
|---|---|
| Fluro rubber (Du Pont product, Viton B) | 100 phr |
| FEF carbon black | 35 phr |
| Magnesium oxide | 5 phr |
| N,N'-dicinnamylidene-1,6-hexane diamine | 3 phr |

Mixing, vulcanization (press cure was done at 205° C., for 4 minutes; secondary cure was at 215° C., for 2 hours), and measurement were carried out by the same methods as in Example 1.

Example 4

In Example 1, fifteen (15) phr of SRF carbon black and 20 phr of silica (Aerosil Co. product, A200) were used instead of FEF carbon black.

Example 5

In Example 1, ten (10) phr of HAF and 20 phr of calcium metasilicate (Tomoe Kogyo product, NYAD1250) were used instead of FEF carbon black.

Example 6

In Example 1, seven (7) phr of ISAF and 25 phr of graphite (Nichiden Carbon product, Graphite AO) were used instead of FEF carbon black. And the amounts of organic peroxide and triallylisocyanurate were changed to 1 and 3.5 phr, respectively.

Example 7

In Example 1, ten (10) phr of ISAF carbon black and 35 phr of mica (Yamaguchi Mica Kogyosho product, Mica Powder A21A) were used instead of FEF carbon black. And the amounts of organic peroxide and triallylisocyanurate were changed to 1 and 3.5 phr, respectively.

Example 8

In Example 7, same amount of silica (Aerosil A200) was used instead of ISAF carbon black.

Comparative Example 5

In Example 7, same amount of MT carbon black was used instead of ISAF carbon black.

Example 9

In Example 7, twenty (20) phr of calcium metasilicate (Tomoe Kogyo product, Wollascoat) was used instead of 35 phr of mica.

Comparative Example 6

| | |
|---|---|
| Hydrogenated NBR | 100 phr |
| (Nippon Zeon product, Zetpol 1010) | |
| FEF carbon black | 10 phr |
| Magnesium oxide | 5 phr |
| Acetone | 30 phr |
| Methanol | 10 phr |

-continued

| | |
|---|---|
| Organic peroxide (Percumyl D) | 1.5 phr |
| Triallylisocyanurate | 3 phr |
| (Nihon Kasei product, Taic M60, 60%) | |

Mixing, vulcanization, and measurement were carried out by the same method as Comparative Example 3.

The results of the measurement of both examples and comparative examples are shown in Table 1.

TABLE 1

| Example or Comparative Example | Permeability of carbon dioxide | Weight swelling ratio | The number of blisters |
|---|---|---|---|
| Example 1 | 380 | 0.25 | 0 |
| Example 2 | 400 | — | 0 |
| Example 3 | 420 | — | 0 |
| Comparative Example 1 | 970 | 0.60 | 8 |
| Comparative Example 2 | 410 | 0.30 | 6 |
| Comparative Example 3 | 1750 | 0.29 | 10 |
| Comparative Example 4 | 570 | 2.50 | 13 |
| Example 4 | 379 | 0.24 | 0 |
| Example 5 | 375 | 0.25 | 0 |
| Example 6 | 379 | 0.26 | 0 |
| Example 7 | 370 | 0.25 | 0 |
| Example 8 | 382 | 0.23 | 0 |
| Comparative Example 5 | 405 | 0.31 | 9 |
| Example 9 | 379 | 0.26 | 0 |
| Comparative Example 6 | 1350 | — | 10 |

Reference Example 1

Example 10

| | |
|---|---|
| Fluoro thermoplastic elastomer (Daikin product: Daiel-Thermo T-630) | 100 phr |
| FEF carbon black | 10 phr |
| Graphite | 5 phr |
| Calcium metasilicate | 20 phr |
| Stearic acid | 1 phr |
| Magnesium oxide | 6 phr |
| Organic peroxide (Percumyl D) | 1.4 phr |
| Triallyl isocyanurate | 1 phr |

Ingredients except for the organic peroxide were mixed by using a 3L kneader, further kneaded using a heat roll (80° C.), and finally the organic peroxide was added. This composition was press vulcanized at 195° C., at 100 kgf/cm$^2$, and for 4 minutes and then oven vulcanized (secondary cure) at 200° C. for 6 hours to obtain vulcanized sheets having a thickness of 2 mm.

The thus obtained sheet was tested for gas permeability by using a gas permeability measurement device of Gasperm 100 type (Nihon Bunko Kogyo product) under the condition of room temperature, at 5 kgf/cm$^2$, and 60 minutes ($N_2$, $O_2$) or 30 minutes ($CO_2$).

Reference Example 2

Example 11

In Reference Example 1, same amount silica (Aerosil A200) was used instead of FEF carbon black.

Reference Example 3

Example 12

In Reference Example 1, Graphite and calcium metasilicate which are non-reinforcing fillers were not used and 55 phr of FEF carbon black was used instead of 10 phr of FEF carbon black.

Reference Example 4

Comparative Example 7

In Reference Example 1, same amount of hydrogenated NBR (Zetpol 1010) was used instead of fluoro thermoplastic elastomer. This composition was press vulcanized at the temperature of 180° C., at the pressure of 100 kgf/cm2, and for 8 minutes and then oven cured (secondary cure) at 150° C. for 1 hour to obtain vulcanized sheets having a thickness of 2 mm.

Permeability (cm$^2$·mm/m$^2$·atm·24 hours) to various gases measured on aforementioned Reference Examples are shown in Table 2.

TABLE 2

| Gas | Reference Example 1 | Reference Example 2 | Reference Example 3 | Reference Example 4 |
|---|---|---|---|---|
| Nitrogen gas | 20 | 5 | 25 | 20 |
| Oxygen gas | 60 | 55 | 115 | 70 |
| Carbon dioxide gas | 381 | 390 | 423 | 1320 |

As is shown in Table 2, hydrogenated NBR composition shows an excellent performance as a gas barrier material to nitrogen and oxygen gases, however, poor gas barrier performance to carbon dioxide was shown. On the other hand, the compositions of the present invention show excellent properties in anti-gas permeability to carbon dioxide.

Next, a sealing device will be explained below.
Composition A

| | |
|---|---|
| Fluoro rubber (Du Pont product, Viton B) | 100 phr |
| MT carbon black | 15 phr |
| Calcium oxide | 15 phr |
| Magnesium oxide | 15 phr |
| Organic peroxide (Percumyl D) | 1.5 phr |
| Triallyl isocyanurate | 3 phr |
| (Nihon Yusi, Taic M60, 60%,) | |

All ingredients in the above recipe were mixed and further kneaded as the same condition as described in Example 1. Then the compound obtained was press cured at 190° C., for 8 minutes, and then oven cured in an oven (secondary cure) at 200° C., for 13 hours. Measurement of gas permeability of the thus obtained sample was carried out using the same procedures as described in Example 1.

Reference Example 6

Composition B

| | |
|---|---|
| Fluoro rubber (Du Pont product, Viton B) | 100 phr |
| FEF carbon black | 35 phr |
| Calcium oxide | 5 phr |
| N,N'-dicinnamylidene-1,6-hexanediamine | 3 phr |

All ingredients in the above recipe were mixed and further kneaded as the same condition described in Example 1. Then the composition obtained was press cured at 205° C., for 4 minutes, and then oven cured in an oven (secondary cure) at 215° C., for 22 hours. Measurement of gas permeability of the thus obtained sample was carried out using the same procedures as described in Example 1.

Results of the measurements of permeability of carbon dioxide gas are shown in Table 3.

TABLE 3

| Example or Composition | Permeability of carbon dioxide |
|---|---|
| Example 1 | 380 |
| Example 4 | 379 |
| Composition A | 580 |
| Composition B | 570 |

Example 13

In sealing device shown in FIG. 1, the sliding sealing portion 5 was made of the same composition as described in Example 1 and the sliding sealing portion 6 was made of the same composition as described in Composition A.

Example 14

In the sealing device shown in FIG. 1, the sliding sealing portion 5 was made of the same composition as described in Example 4 and the sliding sealing portion 6 was made of the same composition as described in Composition A.

Example 15

In the sealing device shown in FIG. 1, the sliding sealing portion 5 was made of the same composition as described in Example 1 and the sliding sealing portion 6 was made of the same composition as described in Composition B.

Example 16

In the sealing device shown in FIG. 1, the sliding sealing portion 5 was made of the same composition as described in Example 4 and the sliding sealing portion 6 was made of the same composition as described in Composition B.

Comparative Example 7

In the sealing device shown in FIG. 1, the sliding sealing portions 5 and 6 were made of the same composition as described in Composition A Comparative Example 8

In the sealing device shown in FIG. 1, the sliding sealing portions 5 and 6 were made of the same composition as described in Composition B.

Sealing device (inner diameter of the sliding sealing portion: 13 mm, outer diameter of the sealing device: 30 mm) in the above Examples (13, 14, 15 and 16) and Comparative examples (7, 8) were made by press molding at 185° C., for 10 minutes, and then oven cured at 165° C., for 10 hours. The thickness of the surface in the sliding sealing portion 5 was 1 mm, and the thickness of the sliding sealing portion 6 was 12 mm. Sealing properties of these sealing devices were evaluated under the condition that the diameter of the shaft which slidably and sealingly contacts with the sliding sealing portion of the sealing device was 15 mm, the revolution of the shaft was 2000 rpm, sealing oil which was used for lubrication to the sliding sealing portion was SAE30W, test temperature was 100° C. More detailed test conditions were as follows.

The carbon dioxide side of the sealing device was set to keep airtight conditions. This airtight room was at first filled with carbon dioxide gas at a pressure of 5 Kgf/cm² and the change of the pressure decrease in the room was measured during the test operation. Carbon dioxide gas permeability of the sealing device made of only fluoro rubber composition was set to 1, and then the permeability of the Examples were measured, and relative permeability were then calculated.

Gas permeability coefficient, Pc, of the sealing device having a laminated seal lip portion made of both fluoro rubber and fluoro thermoplastic elastomer (TPE) compositions as shown in FIG. 1 was theoretically calculated by the following equation.

$$1/Pc = \phi_{rubber} P_{rubber} + \phi_{TPE} P_{TPE}$$

$P_{rubber}$: Gas permeability of fluoro rubber
$P_{TPE}$: Gas permeability of TPE
$\phi_{rubber}$: Volume ratio of fluoro rubber
$P_{rubber}$: Volume ratio of TPE The results obtained were shown in FIG. 5 and the theoretical curve calculated by the above equation was also shown as well in FIG. 5.

What is claimed is:

1. A method of preparing a molded sealing composition for sealing against permeation of carbon dioxide gas, comprising the steps of:
   (1) preparing a molding composition comprising a fluoro thermoplastic elastomer and a reinforcing filler having a particle size of not more than 100 nm;
   (2) molding said molding composition to obtain a vulcanized rubber composition; and
   (3) contacting said vulcanized rubber composition with carbon dioxide gas have carbon dioxide as a majority component to separate an air side from a carbon dioxide gas side.

2. The method of preparing a molded sealing composition for sealing against permeation of carbon dioxide gas according to claim 1, wherein said molding composition further comprises a non-reinforcing filler.

3. The method of preparing a molded sealing composition for sealing against permeation of carbon dioxide gas according to claim 1, wherein said molding composition further comprises an organic peroxide crosslinking agent.

4. The method of preparing a molded sealing composition for sealing against permeation of carbon dioxide gas according to claim 1, wherein said molding composition further comprises an organic solvent.

5. The method of preparing a molded sealing composition for sealing against permeation of carbon dioxide gas according to claim 1, wherein an amount of said reinforcing filler used in said molding composition is in the range of about 5 to 100 phr based on 100 phr of said fluoro thermoplastic elastomer.

6. The method of preparing a molded sealing composition for sealing against permeation of carbon dioxide gas according to claim 1, wherein said vulcanized rubber composition is in a form of an oil seal.

7. The method of preparing a molded sealing composition for sealing against permeation of carbon dioxide gas according to claim 1, wherein said vulcanized rubber composition is in a form of a hose or tube.

8. The method of preparing a molded sealing composition for sealing against permeation of carbon dioxide gas according to claim 1, wherein said vulcanized rubber composition is in a form of a diaphragm.

* * * * *